(12) United States Patent
Sato et al.

(10) Patent No.: US 11,292,626 B2
(45) Date of Patent: Apr. 5, 2022

(54) BINDING DEVICE

(71) Applicants: NICHIBAN CO., LTD., Tokyo (JP); MICROJENICS INC., Toyama (JP)

(72) Inventors: Masanori Sato, Tokyo (JP); Toru Katada, Toyama (JP); Masahiko Noda, Osaka (JP)

(73) Assignees: NICHIBAN CO., LTD., Tokyo (JP); MICROJENICS INC., Toyama (JP)

( * ) Notice: Subject to any disclaimer, the term of this patent is extended or adjusted under 35 U.S.C. 154(b) by 31 days.

(21) Appl. No.: 16/971,880

(22) PCT Filed: Feb. 4, 2019

(86) PCT No.: PCT/JP2019/003888
§ 371 (c)(1),
(2) Date: Aug. 21, 2020

(87) PCT Pub. No.: WO2019/163504
PCT Pub. Date: Aug. 29, 2019

(65) Prior Publication Data
US 2021/0086929 A1 Mar. 25, 2021

(30) Foreign Application Priority Data

Feb. 23, 2018 (JP) .............................. JP2018-030832

(51) Int. Cl.
*B65B 13/02* (2006.01)
*B65B 13/04* (2006.01)
(Continued)

(52) U.S. Cl.
CPC .......... *B65B 13/025* (2013.01); *A01G 17/08* (2013.01); *A01G 17/085* (2013.01); *B65B 13/04* (2013.01); *B65B 13/185* (2013.01); *B65B 27/105* (2013.01)

(58) Field of Classification Search
CPC ....... B65B 13/04; B65B 13/025; B65B 13/18; B65B 13/183; B65B 13/345;
(Continued)

(56) References Cited

U.S. PATENT DOCUMENTS

| 2008/0104886 A1* | 5/2008 | Nakamura | ............ B65B 13/305 |
| | | | 47/1.01 S |
| 2015/0181810 A1* | 7/2015 | Cho | ..................... A01G 17/085 |
| | | | 227/120 |

(Continued)

FOREIGN PATENT DOCUMENTS

| JP | 54-97387 U | 7/1979 |
| JP | 56-023417 A | 3/1981 |

(Continued)

*Primary Examiner* — Jimmy T Nguyen
(74) *Attorney, Agent, or Firm* — Porter Wright Morris & Arthur LLP

(57) ABSTRACT

A binding device that prevents damage to binding tape including a biodegradable material as a base material comprises a pressing surface formed on a resin attachment which is detachably mounted on a head of a tape holding plate, and therefore it is possible to mount an attachment of a shape and material suitable for binding tape to be used. Furthermore, because the tape receiving plate is formed by a rubber plate, the tape receiving plate is able to absorb a shock generated by the pointed end of the tape holding plate entering the tape receiving plate. With this arrangement, it possible to prevent damage to fragile binding tape including a biodegradable material as a base material.

2 Claims, 6 Drawing Sheets

(51) Int. Cl.
*B65B 13/18* (2006.01)
*A01G 17/08* (2006.01)
*B65B 27/10* (2006.01)

(58) Field of Classification Search
CPC ..... B65B 13/327; B65B 13/185; B65B 13/16;
B65B 13/20; B65B 27/00; B65B 51/06;
B65B 27/105; A01G 17/08; A01G
17/085; A01G 5/02; A01G 9/12; A01F
1/04; A01B 1/00
USPC .............. 100/6, 16, 33 PB, 33 R; 47/1.01 R,
47/1.01 S
See application file for complete search history.

(56) References Cited

U.S. PATENT DOCUMENTS

2015/0307216 A1* 10/2015 Sato ..................... A01G 17/08
100/33 R
2017/0359973 A1* 12/2017 Taguchi ................ A01G 17/08

FOREIGN PATENT DOCUMENTS

| | | |
|---|---:|---:|
| JP | 59-69109 U | 5/1984 |
| JP | 2005-247373 A | 9/2005 |
| JP | 2006-50913 A | 2/2006 |
| JP | 2010-274937 A | 12/2010 |
| JP | 2015-157634 A | 9/2015 |
| JP | 2017-222396 A | 12/2017 |

\* cited by examiner

BINDING DEVICE

TECHNICAL FIELD

The present invention relates to a binding device, and relates to a plier-type binding device that binds an object to be bound with binding tape stretched between a pair of arms.

BACKGROUND ART

In a so-called plier-type binding device, if a pair of gripped arms is slightly returned at a time when binding tape is stretched between the pair of arms, in conjunction with this, a tape holding plate of a tape retaining mechanism moves forward. Then, an end portion of the binding tape drawn from a tape reel is retained by a tape receiving plate and the tape holding plate (e.g., refer to Patent Literature 1). In such a binding device, in a case where binding tape including a biodegradable material as a base material (hereinafter referred to as "biodegradable tape") is used, the biodegradable tape may be damaged (torn) by causing a pointed head tip end portion of the tape holding plate to enter, because the biodegradable tape is more fragile than ordinary binding tape including a non-biodegradable material as a base material (hereinafter referred to as "non-biodegradable tape").

CITATION LIST

Patent Literature

Patent Literature 1: JP 2015-157634 A

SUMMARY OF INVENTION

Technical Problem

An object of the present invention is to provide a binding device that prevents damage to binding tape including a biodegradable material as a base material.

Solution to Problem

The present invention relates to a binding device including a pair of arms that rotates about a fulcrum by a pair of grips being tightly gripped, a tape supporting mechanism that supports binding tape drawably, a tape feeding mechanism that feeds the binding tape drawn from the tape supporting mechanism, a tape retaining mechanism that retains an end portion of the binding tape fed from the tape feeding mechanism, and a tape press-bonding mechanism that press-bonds joining portions of the binding tape fed from the tape feeding mechanism. The binding device causes the binding tape stretched between the pair of arms to bind an object to be bound attracted between the pair of arms, in which the tape retaining mechanism includes an operation plate that is provided on one arm, a movable plate that is provided on another arm and operated by the operation plate, a tape holding plate that is provided on the other arm and operates in conjunction with the movable plate, and a tape receiving plate that is provided on the other arm. The tape retaining mechanism is configured to retain, between the tape receiving plate and the tape holding plate, the end portion of the binding tape fed from the tape feeding mechanism by the tape receiving plate receiving a tip end portion of the tape holding plate, and the tape receiving plate is formed by an elastic body.

Advantageous Effects of Invention

According to the present invention, it is possible to provide a binding device that prevents damage to binding tape including a biodegradable material as a base material.

DESCRIPTION OF EMBODIMENTS

Figure 1:
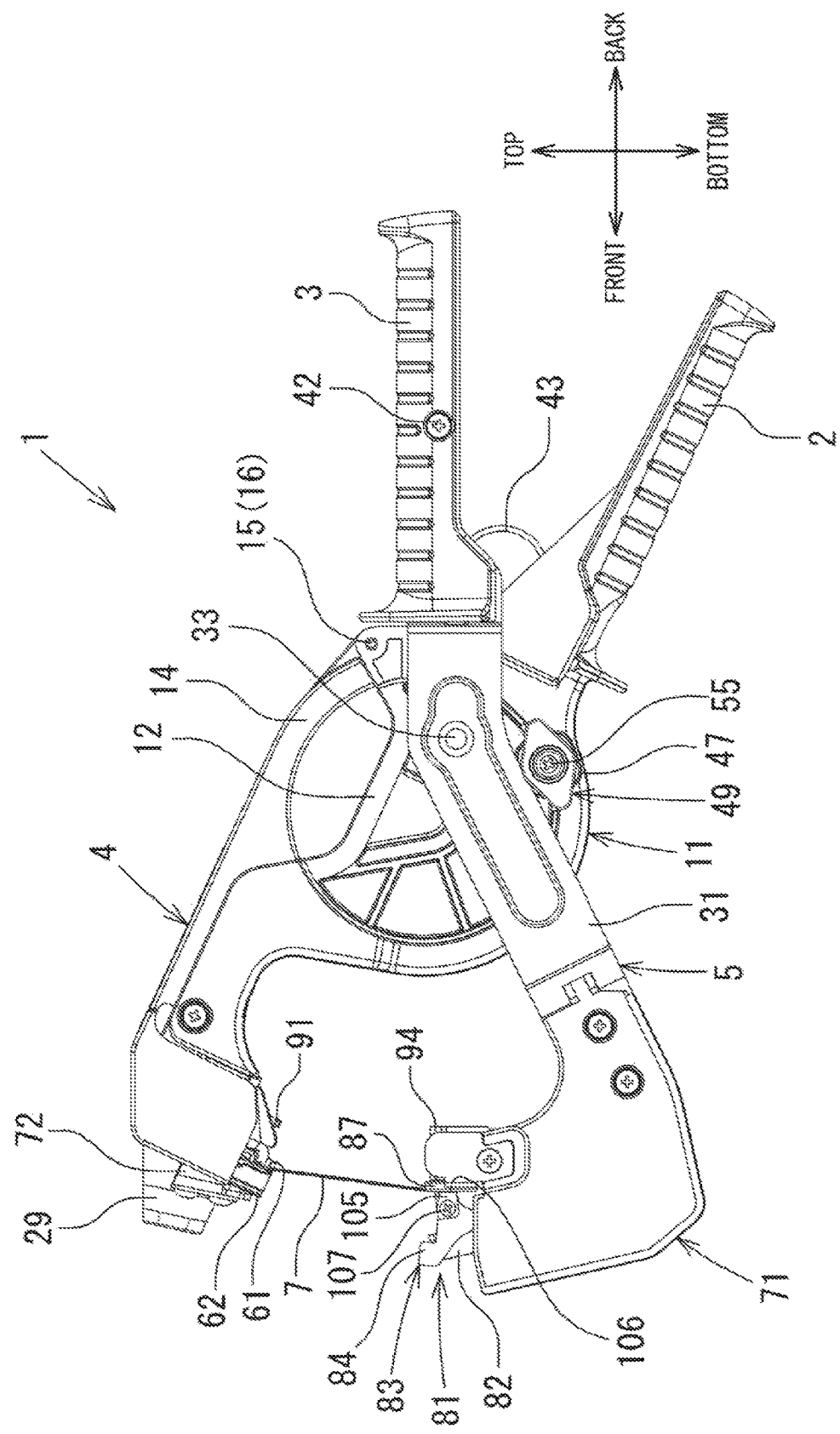
FIG. 1 illustrates a plan view of a binding device according to the present embodiment.

Hereinafter, an embodiment of the present invention will be described with reference to the accompanying drawings. Orientations in use of a binding device 1 are assumed to be but not limited to "top-bottom direction", "right-left direction", and "front-back direction" as illustrated for convenience in a coordinate system in the drawings.

With reference to FIGS. 1 to 4, the binding device 1 is a so-called plier-type binding device, in which an object to be bound (illustration omitted) is attracted between a pair of arms 4, 5, and in this state, a pair of grips 2, 3 is tightly gripped, and the pair of arms 4, 5 is rotated about a fulcrum. Thus, the object to be bound is bound by binding tape 7 (refer to FIG. 1) stretched between the pair of arms 4, 5.

Figure 3:
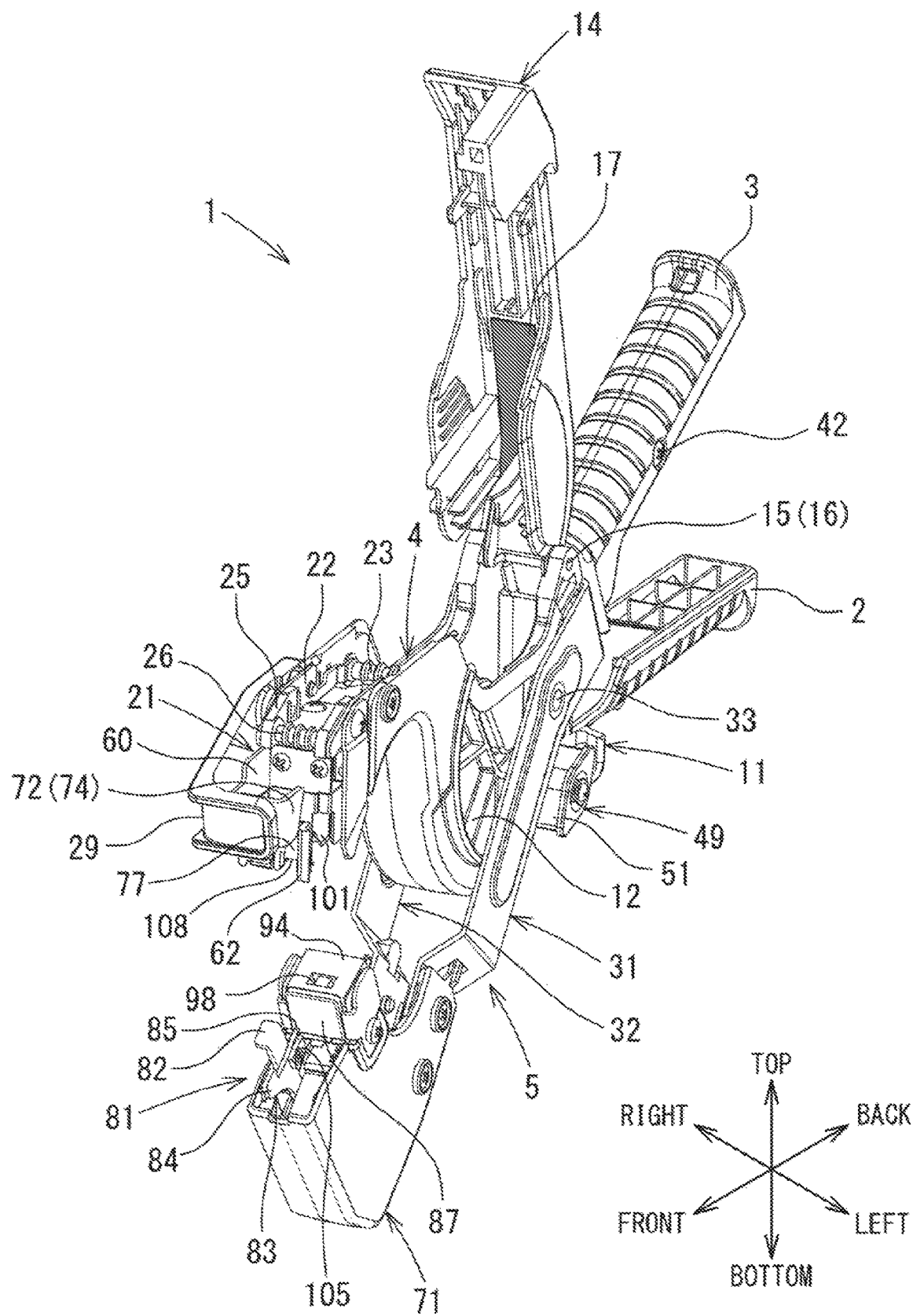
FIG. 3 illustrates a perspective view of the binding device according to the present embodiment, and especially illustrates a state where a cover is open.
Figure 4:
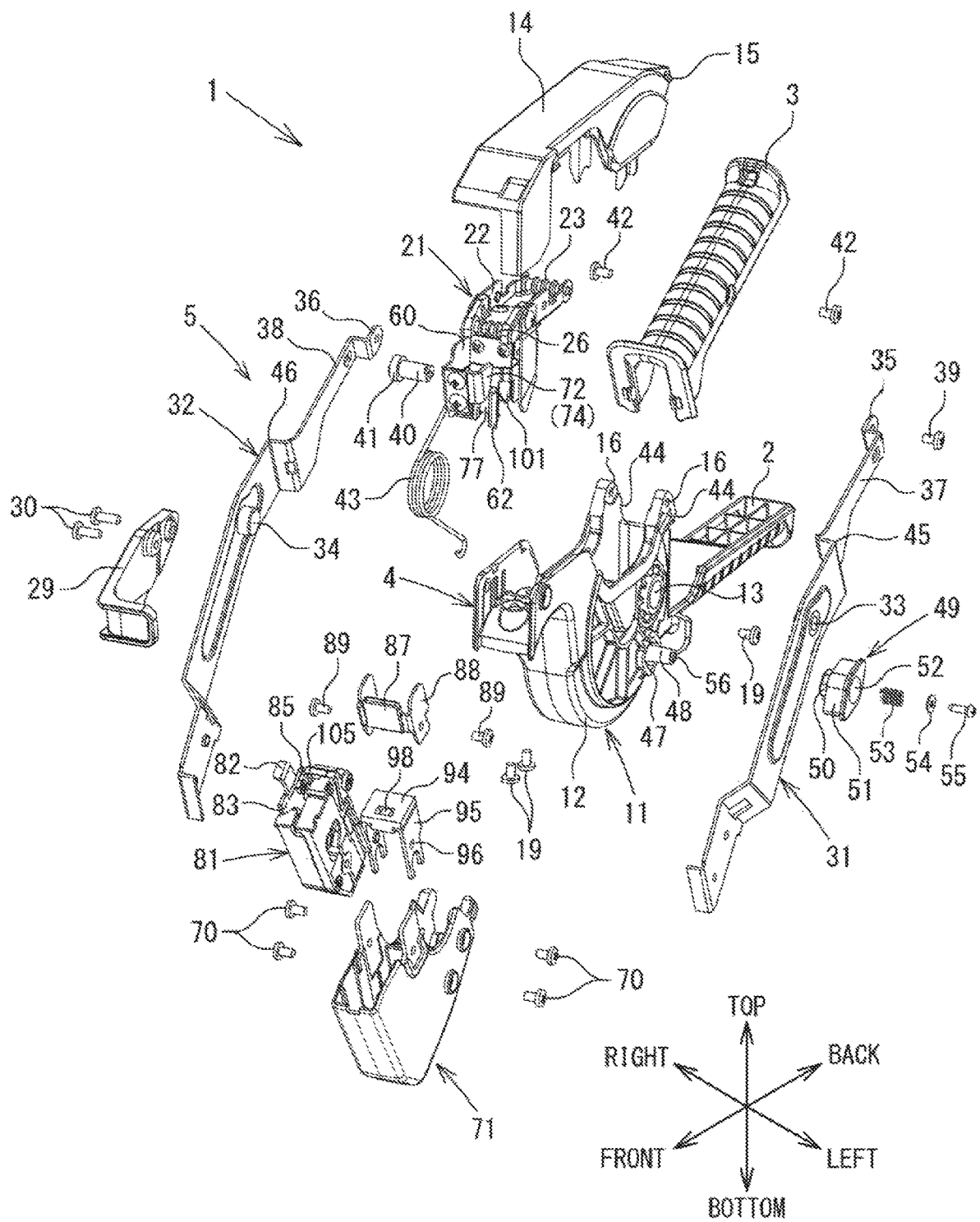
FIG. 4 illustrates an exploded perspective view of the binding device according to the present embodiment.

As illustrated in FIGS. 3 and 4, the binding device 1 has an upper base 11 that supports an upper unit 21 and a lower base 71 that supports a lower unit 81. The upper base 11 is a resin molded part, and the grip 2 and the arm 4 (one arm) are integrally formed. Between the grip 2 and arm 4 of the upper base 11, there is provided a tape housing 12 that houses the binding tape 7 mounted on the tape reel (illustration omitted). Furthermore, the binding device 1 has a pair of side plates 31, 32 extending in the front-back direction. The side plates 31, 32 are disposed on right and left of the upper base 11 so as to sandwich the upper base 11. It should be noted that the side plate 31 and the side plate 32 are metal parts formed substantially symmetrically.

The side plates 31, 32 have shaft parts 33, 34 (fulcrums) projected at middle parts of inner side surfaces (facing surfaces) in the front-back direction. The shaft parts 33, 34 are slidably fitted in shaft holes 13, 13 (only the shaft hole 13 on a left side is illustrated in FIG. 4) formed in the upper base 11. Back ends 35, 36 of the side plates 31, 32 are joined by a screw 39. The grip 3, which is a resin molded part, is mounted on back parts 37, 38 of the side plates 31, 32. A shaft 40 on which a flange 41 is formed is interposed between the back parts 37, 38 of the side plates 31, 32. The shaft 40 has a shaft hole in which a female thread is formed, and is fixed between the back parts 37, 38 of the side plates 31, 32, together with the grip 3 by screws 42, 42 inserted from both right and left sides of the grip 3.

One end of a torsion spring 43 is engaged with the shaft 40 interposed between the back parts 37, 38 of the side plates 31, 32. Another end of the torsion spring 43 is fixed inside the grip 2 of the upper base 11. Thus, the grips 2, 3 are urged in an opening direction by spring force of the torsion spring 43. It should be noted that the arms 4, 5 are retained in an open position (refer to FIG. 1) by step portions 45, 46 of the side plates 31, 32 coming into contact with the claw parts 44, 44 of the upper base 11. The arm 5 is configured by a front side part of the side plates 31, 32 facing each other, in other words, a portion forward of the shaft parts 33, 34 (fulcrums).

The binding device 1 includes a restriction mechanism that restricts opening operation of the arms 4, 5 and retains the arms 4, 5 at a half-open position that is convenient when the binding device 1 is carried. The restriction mechanism has a boss part 47 that has a substantially square cross section and is provided on a left side wall of the upper base 11, a shaft part 48 that is provided to stand at a center of the boss part 47 and extending laterally (leftward) from the left side wall of the upper base 11, and a restriction member 49 in which a shaft hole (illustration omitted) fitted into the shaft part 48 is formed. The restriction member 49 has a fitting part 50 that has a substantially square cross section and is removably fitted inside the boss part 47, and a restriction part 51 that has a substantially rhombus cross section and is provided at a left end of the fitting part 50. A counterbore hole 52 concentric with the shaft hole is formed on an end surface of the restriction part 51. A compression spring 53 is inserted in the counterbore hole 52. The compression spring 53 is compressed by a fixed amount by screwing a washer 54 (spring holding plate), the compression spring 53, and a screw 55 inserted through the shaft hole into a shaft hole 56 (threaded hole) of the shaft part 48. Then, by spring force of the compression spring 53 generated at this time, the restriction member 49 is pressed against the upper base 11.

Then, during binding work, the fitting part 50 of the restriction member 49 is fitted inside the boss part 47 so that a longer diagonal line of the restriction part 51 becomes substantially parallel to the arm 5. Thus, the arms 4, 5 are retained in an open position (refer to FIG. 1) in a state where the grips 2, 3 are not tightly gripped. Meanwhile, when the binding device 1 is carried, the fitting part 50 of the restriction member 49 is fitted inside the boss part 47 so that a shorter diagonal line of the restriction part 51 becomes substantially parallel to the arm 5. In other words, after the restriction member 49 is pulled up while compressing the compression spring 53, the restriction member 49 is rotated 90° around the shaft part 48 from a position for binding work, and the fitting part 50 of the restriction member 49 is fitted inside the boss part 47. Thus, the arms 4, 5 are retained at a half-open position that is convenient when the binding device 1 is carried.

The binding device 1 includes a tape supporting mechanism that supports the binding tape 7 drawably. The tape supporting mechanism includes the above-described tape reel and tape housing 12. Furthermore, the tape supporting mechanism has a cover 14 that covers an upper opening of the tape housing 12 and the arm 4. On both right and left sides of a back end portion of the cover 14, there is provided a pair of protrusions 15, 15 (only a protrusion 15 on a left side is illustrated in FIG. 4) protruding laterally (outward). Meanwhile, on both right and left sides of an upper end portion of the upper base 11, there are provided holes 16, 16 into which the protrusions 15, 15 of the cover 14 are slidably fitted. The holes 16, 16 are concentric with the protrusions 15, 15. With this arrangement, the cover 14 is rotatable around an axis of the holes 16, 16 with respect to the upper base 11.

Figure 5:
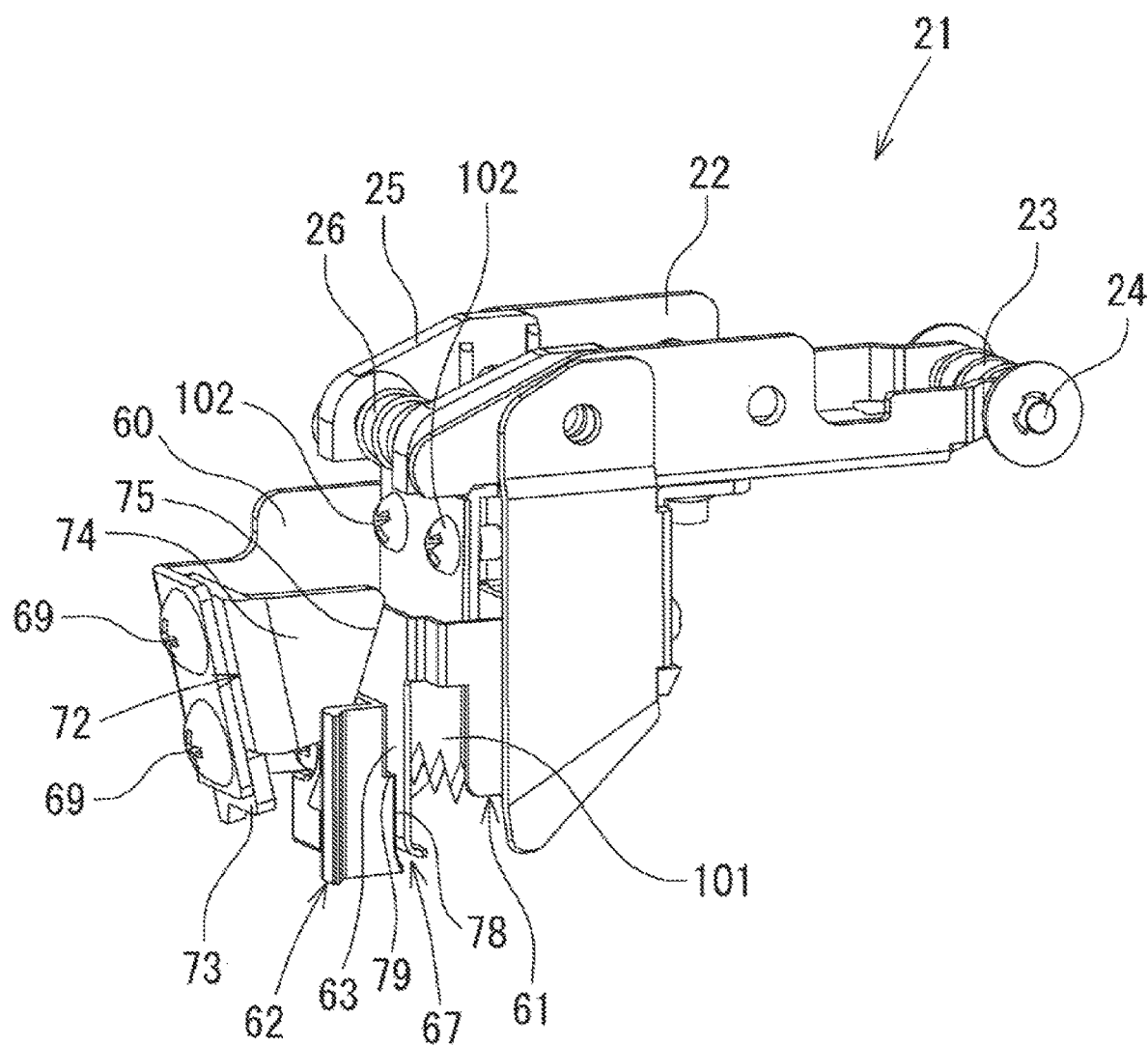
FIG. 5 illustrates an explanatory diagram of the binding device according to the present embodiment and illustrates a perspective view of an upper unit.
Figure 6:
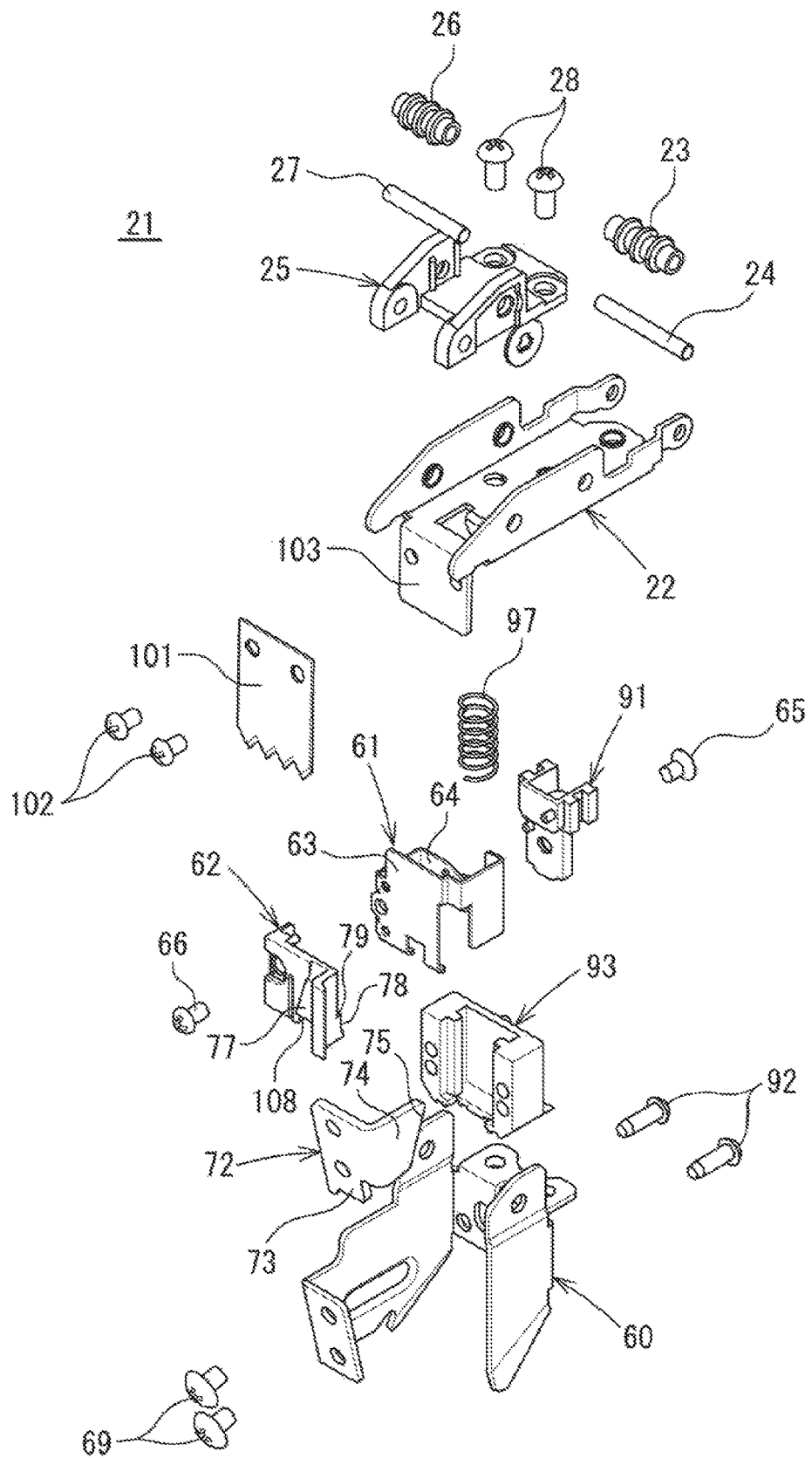
FIG. 6 illustrates an explanatory diagram of the binding device according to the present embodiment and illustrates an exploded perspective view of the upper unit.

With reference to FIGS. 3, 5, and 6, the upper unit 21 has a base plate 22 including metal, which is provided inside the arm 4. The base plate 22 is fixed to the arm 4 by three screws 19. At a back end portion of the base plate 22, a resin roller 23 that supports a non-adhesive surface of the binding tape 7 drawn from the tape housing 12 is provided. The resin roller 23 is rotatably supported by a shaft member 24 having both ends supported by side plates of the base plate 22. Furthermore, a guide plate 25 including resin, which guides both right and left sides of the binding tape 7 drawn from the tape housing 12 is provided at a front end portion of the base plate 22. It should be noted that a cover 29 that covers a front end portion of the upper unit 21 is fixed to a right side wall of a front end portion of the arm 4 by screws 30, 30.

At a front end portion of the guide plate 25, a resin roller 26 that supports the non-adhesive surface of the binding tape 7 extending from the tape housing 12 via the resin roller 23 is provided. The resin roller 26 is rotatably supported by a shaft member 27 having both ends supported by side plates of the guide plate 25. It should be noted that the guide plate 25 is fixed to the base plate 22 by screws 28, 28. Furthermore, the tape supporting mechanism includes the resin rollers 23, 66 and the guide plate 25.

The binding device 1 includes a tape feeding mechanism that feeds the binding tape 7 drawn from the tape housing 12. The tape feeding mechanism is formed on a frame plate 60 fixed to the base plate 22. The tape feeding mechanism has a first guide plate 61 that guides the non-adhesive surface of the binding tape 7 guided by the guide plate 25, and a second guide plate 62 that is provided facing the first guide plate 61 and guides an adhesive surface of the binding tape 7 guided by the guide plate 25. It should be noted that the first guide plate 61 is a metal part, and the second guide plate 62 is a resin molded part. Furthermore, the binding tape 7 can be inserted from a left side of the binding device 1 into a gap 67 (refer to FIG. 5) between the first guide plate 61 and the second guide plate 62.

The frame plate 60 is fixed to the base plate 22 by the screws 28, 28. That is, the screws 28, 28 fix the guide plate 25 and the frame plate 60 by fastening the guide plate 25 and the frame plate 60 to the base plate 22 together. The first guide plate 61 has a front side wall 63 having a guide surface formed on a front side and a back side wall 64 facing the front side wall 63. Furthermore, the first guide plate 61 is fixed to a press-bonding member 91, which will be described later, by a screw 65. The second guide plate 62 is fixed to the front side wall 63 of the first guide plate 61 by a screw 66.

The binding device 1 includes a tape retaining mechanism that retains an end portion 8 (refer to FIG. 2) of the binding tape 7 drawn from the tape housing 12. The tape retaining mechanism has an operation plate 72 fixed to a front end portion of the frame plate 60 by screws 69, 69, and the lower unit 81 provided on the lower base 71. It should be noted that the lower base 71 is a resin molded part and is fixed to front end portions of the side plates 31, 32 by four screws 70 (refer to FIG. 4).

Figure 2:
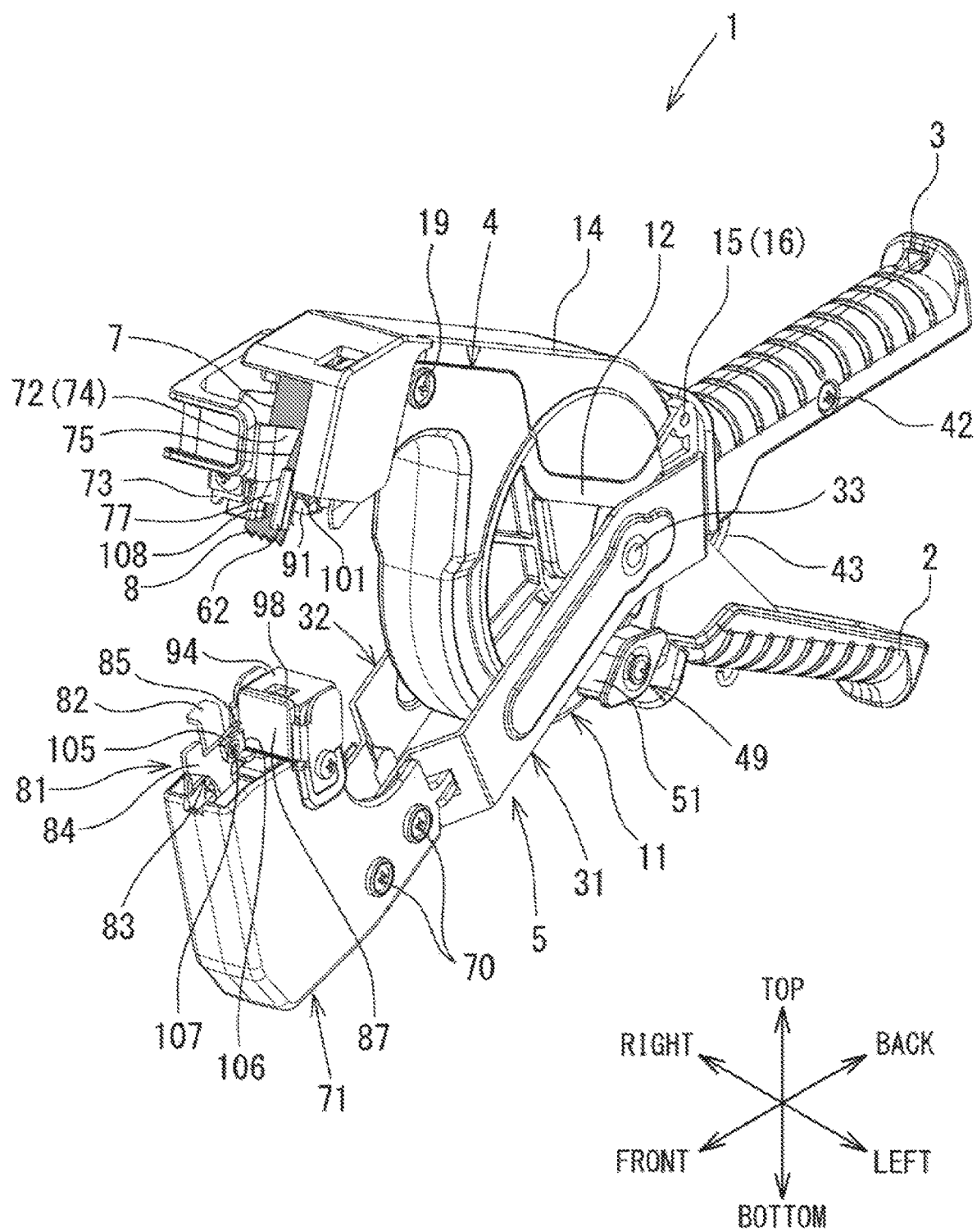
FIG. 2 illustrates a perspective view of the binding device according to the present embodiment.

With reference to FIGS. 2 to 4, in the lower unit 81, a lever 82 (movable plate) pushed in by the operation plate 72 triggers a tape holding plate 83 to operate in conjunction with the lever 82. Then, a pointed end 85 (refer to FIG. 2) of a head 84 (tip end portion) of the tape holding plate 83 enters a tape receiving plate 87 (refer to FIG. 1). Thus, the end portion 8 of the binding tape 7 is retained by the tape holding plate 83 and the tape receiving plate 87. Meanwhile, when the binding tape 7 is cut, the lever 82 pushed in by the operation plate 72 triggers the tape holding plate 83 to be pulled back to an original position.

The binding device 1 includes a tape press-bonding mechanism that pressurizes and press-bonds joining portions of the binding tape 7. The tape press-bonding mechanism has a movable part provided on the base plate 22 of the upper unit 21 and a fixed part provided on the lower base 71. With reference to FIG. 6, the movable part has the press-bonding member 91 that is a resin molded part, and a guide member 93 that guides the press-bonding member 91 in the top-bottom direction. The guide member 93 is a resin molded part, and is fixed to a back end portion the frame plate 60 by screws 92, 92. Meanwhile, the fixed part has a tape press-bonding plate 94 including synthetic rubber. The tape press-bonding plate 94 is fixed to a pedestal 95. On the pedestal 95, threaded holes 96, 96 into which screws 89, 89 are screwed are formed. The screws 89, 89 are for fixing the tape press-bonding plate 94 to the lower base 71. It should be noted that the screws 89, 89 fix a pedestal 88 of the tape receiving plate 87 to the lower base 71.

The tape press-bonding mechanism has a compression spring 97 interposed between the press-bonding member 91 and the base plate 22. The compression spring 97 urges the press-bonding member 91, and further the first guide plate 61 and the second guide plate 62, which move integrally with the press-bonding member 91, downward with respect to the base plate 22. Then, the press-bonding member 91 is lowered toward the joining portions of the binding tape 7 to cause a protrusion at a lower end of the press-bonding member 91 to enter a recess 98 formed on a tape reception surface of the tape press-bonding plate 94 from above the joining portions of the binding tape 7, by which the joining portions of the binding tape 7 are press-bonded. It should be noted that retention force of the press-bonding member 91 retaining the joining portions of the binding tape 7 can be adjusted by spring force of the compression spring 97.

The binding device 1 includes a tape cutting mechanism that cuts a vicinity of the joining portions (portions to be press-bonded) of the binding tape 7 wound around the object to be bound. The tape cutting mechanism has a cutting edge 101 having a serrated edge formed at a tip end. The cutting edge 101 is fixed to a cutting edge mount 103 at a front end of the base plate 22 by screws 102, 102. Then, when the cutting edge 101 is lowered, in a process of the cutting edge 101 and the tape receiving plate 87 passing each other, the vicinity of the joining portions of the binding tape 7 retained by the press-bonding member 91 is cut by the cutting edge 101.

The binding device 1 includes a tape rewind prevention mechanism for causing the end portion 8 of the binding tape 7, which is drawn from the tape housing 12, to protrude from the tape feeding mechanism in a state where a portion to be held is left by the tape holding plate 83 (refer to FIG. 2) when the tape press-bonding mechanism press-bonds the joining portions of the binding tape 7. The tape rewind prevention mechanism has a rib 74 formed on the above-described operation plate 72. It should be noted that the operation plate 72 includes a metal plate bent in an L shape, and has an operation unit 73 that operates the lever 82 of the lower unit 81 at a lower end, and the rib 74 extending backward from a left end of the operation unit 73. As illustrated in FIG. 5, at a back end of the rib 74, an inclined portion 75 whose protrusion height from the operation unit 73 gradually decreases downward is formed.

Then, the tape rewind prevention mechanism is configured such that the inclined portion 75 of the rib 74 of the operation plate 72 and a front side surface 77 of the second guide plate 62 slidingly move relative to each other by the tape press-bonding plate 94 pushing in the press-bonding member 91 when the tape press-bonding mechanism press-bonds the joining portions of the binding tape 7. Furthermore, the front side surface 77 of the second guide plate 62 is provided with an incline so that the gap 67 between the first guide plate 61 and the second guide plate 62 narrows by the front side wall 63 of the first guide plate 61 pressing the front side surface 77 of the second guide plate 62 due to the inclined portion 75 of the rib 74 in a process of the rib 74 of the operation plate 72 and the second guide plate 62 moving relative to each other as described above. In this way, by the gap 67 between the first guide plate 61 and the second guide plate 62 narrowing, the adhesive surface of the binding tape 7 between the first guide plate 61 and the second guide plate 62 sticks to a guide surface 78 of the second guide plate 62.

Here, the binding device 1 according to the present embodiment corresponds to binding tape 7 including a biodegradable material as a base material. Hereinafter, a structure corresponding to the binding tape 7 including a biodegradable material as a base material will be described.

In a binding device described in Patent Literature 1 described above, a lever of a tape retaining mechanism is pushed in to cause a pointed end of a tape holding plate to enter a slit of a tape receiving plate including a metal plate. In this case, a problem arises in that binding tape including a biodegradable material as a base material is torn due to a shock generated by the pointed end of the tape holding plate entering the slit of the tape receiving plate.

Therefore, in the present embodiment, a structure is designed such that the tape receiving plate 87 including a rubber plate absorbs a shock generated by the pointed end 85 of the head 84 (tip end portion) of the tape holding plate 83 entering the tape receiving plate 87. Furthermore, as illustrated in FIGS. 1 and 2, a structure is designed such that an attachment 105 is mounted on the head 84 of the tape holding plate 83, and a pressing surface 106 (flat surface) of the attachment 105 is pressed against the binding tape 7. The attachment 105 is fixed to a left side surface (a surface opposite to the surface facing the lever 82) of the head 84 of the tape holding plate 83 by a screw 107. Furthermore, the pointed end 85 of the tape holding plate 83 is positioned at an upper end of the attachment 105 and protrudes from the pressing surface 106 of the attachment 105.

It should be noted that a material of the tape receiving plate 87 is required at least to be an elastic body that satisfies a required shock absorbing performance, and, for example, silicone rubber, or the like can be applied. Furthermore, the tape receiving plate 87 is joined (bonded) to the pedestal 88 including metal. Furthermore, the attachment 105 is a resin molded part. Moreover, a notch 108 is formed on the second guide plate 62. The notch 108 has a width that avoids the tape holding plate 83 of the lower unit 81 from hitting the attachment 105 when the tape holding plate 83 is moved in the front-back direction.

Furthermore, in a case where fragile binding tape 7 including a biodegradable material as a base material is used, there is a possibility that the binding tape 7 is pulled and torn when the grips 2, 3 are opened, if the adhesive surface of the binding tape 7 sticks firmly to the guide surface 78 of the second guide plate 62 after the grips 2, 3 are tightly gripped and the end portion 8 of the binding tape 7 drawn from the tape housing 12 is retained by a tape retaining mechanism.

Therefore, in the present embodiment, a structure is designed such that a step 79 (refer to FIGS. 5 and 6) is provided on the guide surface 78 of the second guide plate 62, and the adhesive surface of the binding tape 7 sticks to a position where a shock generated by a lower portion of the second guide plate 62, in other words, the tape holding plate 83 of the lower unit 81, entering the tape receiving plate 87 is more easily transmitted. With this arrangement, it is possible to more reliably peel the binding tape 7 off the guide surface 78 of the second guide plate 62 with a shock generated by the tape holding plate 83 entering the tape receiving plate 87.

Furthermore, the present embodiment includes a sheet 17 (refer to FIG. 3) that is non-adhesive and prevents the adhesive surface of the binding tape 7 from sticking to an inside of the cover 14. The sheet 17 is joined (bonded) to an inner side surface of the cover 14 so as to face the adhesive surface of the binding tape 7 housed in the tape housing 12. With this arrangement, it is possible to prevent damage to the binding tape 7 caused by the binding tape 7 sticking to the cover 14. It should be noted that a sponge, a long and narrow plate having a fluororesin-coated surface, or the like can be used as the sheet 17.

Next, operation of the present embodiment will be described.

First, the binding tape 7 drawn from the tape housing 12 is passed between the first guide plate 61 and second guide plate 62 of the tape feeding mechanism via the guide plate 25. Next, the pair of arms 4, 5 is caused to rotate about the fulcrum (closing operation) by the pair of grips 2, 3 being tightly gripped. When the pair of arms 4, 5 are closed and then the grips 2, 3 tightly gripped are slightly returned, the tape holding plate 83 of the lower unit 81 operates, and then the pointed end 85 of the head 84 (tip end portion) of the tape holding plate 83 enters the tape receiving plate 87 from above the binding tape 7. Thus, the end portion 8 (refer to FIG. 2) of the binding tape 7 is retained between the tape holding plate 83 and the tape receiving plate 87.

Here, when the pointed end 85 of the tape holding plate 83 enters the tape receiving plate 87, a portion of the end portion 8 of the binding tape 7, which is in a vicinity of the pointed end 85 of the tape holding plate 83, is pressed against the tape receiving plate 87 by the attachment 105 mounted on the head 84 of the tape holding plate 83. Then, when the pair of grips 2, 3 is completely opened, as illustrated in FIG. 1, the binding tape 7 drawn from the tape housing 12 is stretched between the pair of arms 4, 5. In this state, when the binding device 1 is operated so that the binding tape 7 stretched between the pair of arms 4, 5 is pressed against the object to be bound, the binding tape 7 is drawn from the tape housing 12, and the object to be bound is attracted between the pair of arms 4, 5.

When the pair of grips 2, 3 is tightly gripped again, the protrusion at the lower end of the press-bonding member 91 of the tape press-bonding mechanism enters the recess 98 of the tape press-bonding plate 94 from above the joining portions of the binding tape 7. Thus, the joining portions of the binding tape 7 wound around the object to be bound is retained, and, at the same time, the tape holding plate 83 of the lower unit 81 is returned. Then, at a timing when the pair of arms 4, 5 is completely closed, the joining portions of the binding tape 7 are press-bonded by the tape press-bonding mechanism, and, at the same time, the vicinity of the joining portions of the binding tape 7 is cut by the cutting edge 101 of the tape cutting mechanism.

Furthermore, in a process of the tape press-bonding mechanism press-bonds the joining portions of the binding tape 7, the gap 67 between the first guide plate 61 and the second guide plate 62 is narrowed by the inclined portion 75 of the rib 74 pressing the front side surface 77 of the second guide plate 62. The front side surface 77 is inclined. Thus, the adhesive surface of the binding tape 7 between the first guide plate 61 and the second guide plate 62 sticks to the guide surface 78 at a lower portion of the second guide plate 62, and the binding tape 7 is retained in the tape feeding mechanism in a state where the end portion 8 (portion of tape to be held) is protruding from the tape feeding mechanism (refer to FIG. 2).

The present embodiment has the following effects.

The binding device 1 according to the present embodiment includes the pair of arms 4, 5 that rotates about the fulcrum by the pair of grips 2, 3 being tightly gripped, the tape supporting mechanism that supports the binding tape 7 drawably, the tape feeding mechanism that feeds the binding tape 7 drawn from the tape supporting mechanism, the tape retaining mechanism that retains the end portion 8 of the binding tape 7 fed from the tape feeding mechanism, and the tape press-bonding mechanism that press-bonds joining portions of the binding tape 7 fed from the tape feeding mechanism. The binding device 1 causes the binding tape 7 stretched between the pair of arms 4, 5 to bind the object to be bound attracted between the pair of arms 4, 5. The tape retaining mechanism includes the operation plate 72 that is provided on the one arm 4, the lever 82 (movable plate) that is provided on the other arm 5 and operated by the operation plate 72, the tape holding plate 83 that is provided on the other arm 5 and operates in conjunction with the lever 82, and the tape receiving plate 87 that is provided on the other arm 5. The tape retaining mechanism is configured to retain, between the tape receiving plate 87 and the tape holding plate 83, and the end portion 8 of the binding tape 7 fed from the tape feeding mechanism by the tape receiving plate 87 receiving the head 84 (tip end portion) of the tape holding plate 83, the tape receiving plate 87 is formed by the rubber plate (elastic body). Therefore, the tape receiving plate 87 is able to absorb a shock generated by the pointed end 85 of the tape holding plate 83 entering the tape receiving plate 87. With this arrangement, it is possible to prevent the binding tape 7 including a biodegradable material as a base material from tearing due to a shock generated by the pointed end 85 of the tape holding plate 83 entering the tape receiving plate 87.

Furthermore, in the present embodiment, the pressing surface 106 (flat surface), which is pressed against the end portion 8 of the binding tape 7, is formed on the head 84 (tip end portion) of the tape holding plate 83. Therefore, it is possible to prevent damage to (tear of) the binding tape 7 including a biodegradable material as a base material, which originates from a position where the pointed end 85 has entered, by pressing the pressing surface 106 (flat surface) against the binding tape 7 in the vicinity of the pointed end 85 of the tape holding plate 83 when the pointed end 85 of the tape holding plate 83 enters the tape receiving plate 87.

Furthermore, in the present embodiment, the pressing surface 106 (flat surface) is formed on an attachment 105 including resin, which is detachably mounted on the head 84 (tip end portion) of the tape holding plate 83. Therefore, it is possible to mount an attachment 105 of a shape and material suitable for application (binding tape 7 to be used).

Furthermore, the present embodiment includes the sheet 17 that is non-adhesive and prevents the adhesive surface of the binding tape 7 from sticking to an inside of the cover 14. Therefore, it is possible to prevent damage to the binding tape 7 cause by the binding tape 7 sticking to the cover 14. With this arrangement, it possible to use fragile binding tape 7 including a biodegradable material as a base material.

Furthermore, in the present embodiment, a structure is designed such that the step 79 is provided on the guide surface 78 of the second guide plate 62, and the adhesive surface of the binding tape 7 sticks to the lower portion of the second guide plate 62 (a position closer to the other arm 5). Therefore, it is possible to more reliably peel the binding tape 7 off the guide surface 78 of the second guide plate 62 with a shock generated by the tape holding plate 83 entering the tape receiving plate 87. With this arrangement, it is possible to prevent damage to the binding tape 7 caused by the binding tape 7 being loaded when the binding tape 7 is drawn from the tape housing 12, and therefore it is possible to use fragile binding tape 7 including a biodegradable material as a base material.

REFERENCE SIGNS LIST

1 Binding device
2, 3 Grip
4, 5 Arm
7 Binding tape
8 End portion
72 Operation plate
82 Lever (movable plate)
83 Tape holding plate
84 Head (tip end portion)
87 Tape receiving plate

The invention claimed is:

1. A binding device comprising:
a pair of arms that rotates about a fulcrum by a pair of grips being tightly gripped; a tape supporting mechanism that supports binding tape drawably; a tape feeding mechanism that feeds the binding tape drawn from the tape supporting mechanism; a tape retaining mechanism that retains an end portion of the binding tape fed from the tape feeding mechanism; and a tape press-bonding mechanism that press-bonds joining portions of the binding tape fed from the tape feeding mechanism, the binding device causing the binding tape stretched between the pair of arms to bind an object to be bound attracted between the pair of arms,
wherein the tape retaining mechanism includes an operation plate that is provided on one arm, a movable plate that is provided on another arm and operated by the operation plate, a tape holding plate that is provided on the other arm and operates in conjunction with the movable plate, and a tape receiving plate that is provided on the other arm, the tape retaining mechanism being configured to retain, between the tape receiving plate and the tape holding plate, the end portion of the binding tape fed from the tape feeding mechanism by the tape receiving plate receiving a tip end portion of the tape holding plate, wherein a flat surface is formed on a resin attachment detachably mounted on the tip end portion of the tape holding plate and is pressed against the end portion of the binding tape, and
the tape receiving plate is formed by an elastic body.

2. The binding device according to claim 1, wherein the binding tape has a base material including a biodegradable material.

\* \* \* \* \*